United States Patent [19]

Lemercier

[11] 4,050,988
[45] Sept. 27, 1977

[54] HEAT-INSULATED DEVICE, FOR INSULATING THE TOP PART OF THE ANNULAR SPACE BETWEEN THE MAIN VESSEL AND THE SAFETY VESSEL OF A FAST-NEUTRON REACTOR

[75] Inventor: Guy Lemercier, Le Puy Ste-Reparade, France

[73] Assignee: Commissariat a l'Energie Atomique, Paris, France

[21] Appl. No.: 609,168

[22] Filed: Aug. 29, 1975

[30] Foreign Application Priority Data
Aug. 30, 1974 France .................... 74.29649

[51] Int. Cl.² .............. G21C 13/04; E04C 3/10; B65D 25/18 B65D/27/30
[52] U.S. Cl. .................... 176/87; 52/224; 220/9 D; 248/DIG. 1; 292/312; 292/318;
[58] Field of Search ............ 176/87; 52/167, 224, 52/615, 618; 220/9 D, 10; 248/DIG. 1, 358 AD, 18; 292/312, 318

[56] References Cited

U.S. PATENT DOCUMENTS

| 2,991,905 | 7/1961 | Monson | 176/87 |
|---|---|---|---|
| 2,995,505 | 8/1961 | Guild | 176/87 |
| 3,236,406 | 2/1966 | First | 220/9 D |
| 3,636,674 | 1/1972 | Cremer | 176/87 |
| 3,945,165 | 3/1976 | Lemercier | 52/406 |

FOREIGN PATENT DOCUMENTS

| 2,043,799 | 2/1971 | France | |
|---|---|---|---|
| 2,125,927 | 9/1972 | France | |
| 1,214,136 | 12/1970 | United Kingdom | 176/87 |
| 1,239,323 | 7/1971 | United Kingdom | 248/DIG. 1 |
| 867,825 | 5/1961 | United Kingdom | |

Primary Examiner—Stephen C. Bentley
Assistant Examiner—Donald P. Walsh
Attorney, Agent, or Firm—Cameron, Kerkam, Sutton, Stowell & Stowell

[57] ABSTRACT

This invention relates to a device for heat-insulating the top part of the annular space separating the main vessel from the safety vessel from a fast-neutron nuclear reactor, the two vessels having a common vertical axis and being open at their top part and covered by a horizontal slab in which the ends are fitted so as to be suspended by the slab.

According to the invention a substantially cylindrical heat-insulating ring is mounted under the slab and cooperates with the slab and with the facing walls of the vessel to bound the region to be insulated. The ring extends through the annular space in a horizontal plane and is carried by the slab by means of tie-rods, and a top insulating ring divided into two coaxial elements rests on the bottom ring and is secured to the walls of the two vessels respectively by an assembly of spacing springs disposed radially and bearing against the two elements.

8 Claims, 3 Drawing Figures

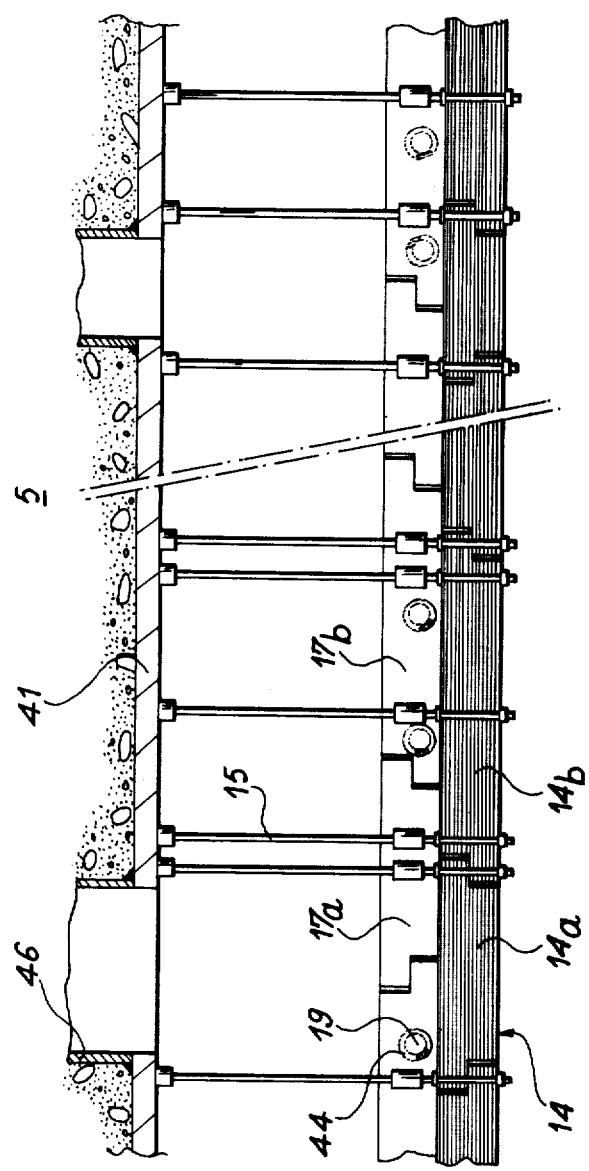

HEAT-INSULATED DEVICE, FOR INSULATING THE TOP PART OF THE ANNULAR SPACE BETWEEN THE MAIN VESSEL AND THE SAFETY VESSEL OF A FAST-NEUTRON REACTOR

The invention relates to a heat-insulating device adapted more particularly to insulate the top part of an annular space formed between the main vessel and the safety vessel of a fast-neutron nuclear reactor, the two vessels having a common vertical axis and being open at their top part and covered by a horizontal slab, normally of concrete, in which the ends or "flaps" of the vessels are fitted so as to be suspended by the slab. The space bounded between the two vessels is filled with an inert gas, usually nitrogen, which is raised to a relatively high temperature by contact with the outer wall of the main vessel, which contains the reactor core and a suitable volume of a liquid metal for extracting the heat liberated by the fuel fission reaction. The "flaps" of the vessels, for example, the places where they are joined to the slab and the parts prolonging the flaps under the slab are delicate components which must be very carefully protected from thermal gradients which may impair their mechanical behavior and consequently, since they suspend the vessels, may affect the safety of the reactor. Consequently, it is necessary to insulate the top part of the space under the slab and in contact with the flaps of the vessels, so as to maintain the inert gas therein at a constant temperature, substantially below the temperature of the rest of the space between the vessels. Advantageously, the annular space is designed to provide easy access to the insulated region, for example for inspecting the welds on the vessel. The heat-insulating system can also be designed to allow axial, transverse variations in the dimensions of the two vessels, which are necessary owing to charges in the temperatures reached, depending on the operating conditions of the reactor, and it should retain its insulating capacity even in the presence of aerosols of the cooling liquid metal, if the latter escapes through the wall of the main vessel.

To this end, the device of the invention is characterised in that is comprises a substantially cylindrical bottom heat-insulating ring mounted under the slab and cooperating therewith and with the facing walls of the vessels to bound the region to be insulated, the ring extending through the annular space in a horizontal plane and being borne by the slab with interposition of tie-rods, and top heat-insulating ring divided into two coaxial elements resting on the bottom ring and secured to the walls of the two vessels respectively by an assembly of spacing springs disposed radially and bearing against the two elements. In one embodiment of the invention, the tie-rods for the bottom ring comprise vertical suspending rods ending in ball-and-socket joints cooperating with cup-shaped housings connected to the slab and to the bottom ring respectively.

Advantageously, the bottom ring and the two components of the top ring are made up of juxtaposed segments. Preferably, the ring segments have a herringbone cross-section and fit together in pairs around the ring periphery.

According to another feature, the bottom ring is associated with a system for adjusting its vertical position with respect to the bottom cup-shaped housing of the tie-rods. According to yet another feature, the springs for spacing the elements of the top ring are guided at their ends bearing against the aforementioned elements, by open sleeves welded to the facing surfaces of the elements.

Finally, the bottom ring and the elements of the top ring have a heat-insulated structure formed by superposing panels each comprising a number of stacked metal sheets, the panels being separated by plates to form thick superposed pads held between end-plates and pressed between the plates by clamping bolts, the side edges of the rings being bounded by interlocking angle members.

Other features of a heat-insulating device according to the invention will be clear from the following description, given by way of illustration with reference to the accompanying drawing, in which:

FIG. 3 is a partly-expanded view of the samd system, showing the construction of the juxtaposed segments in the two rings.

Figure 1:
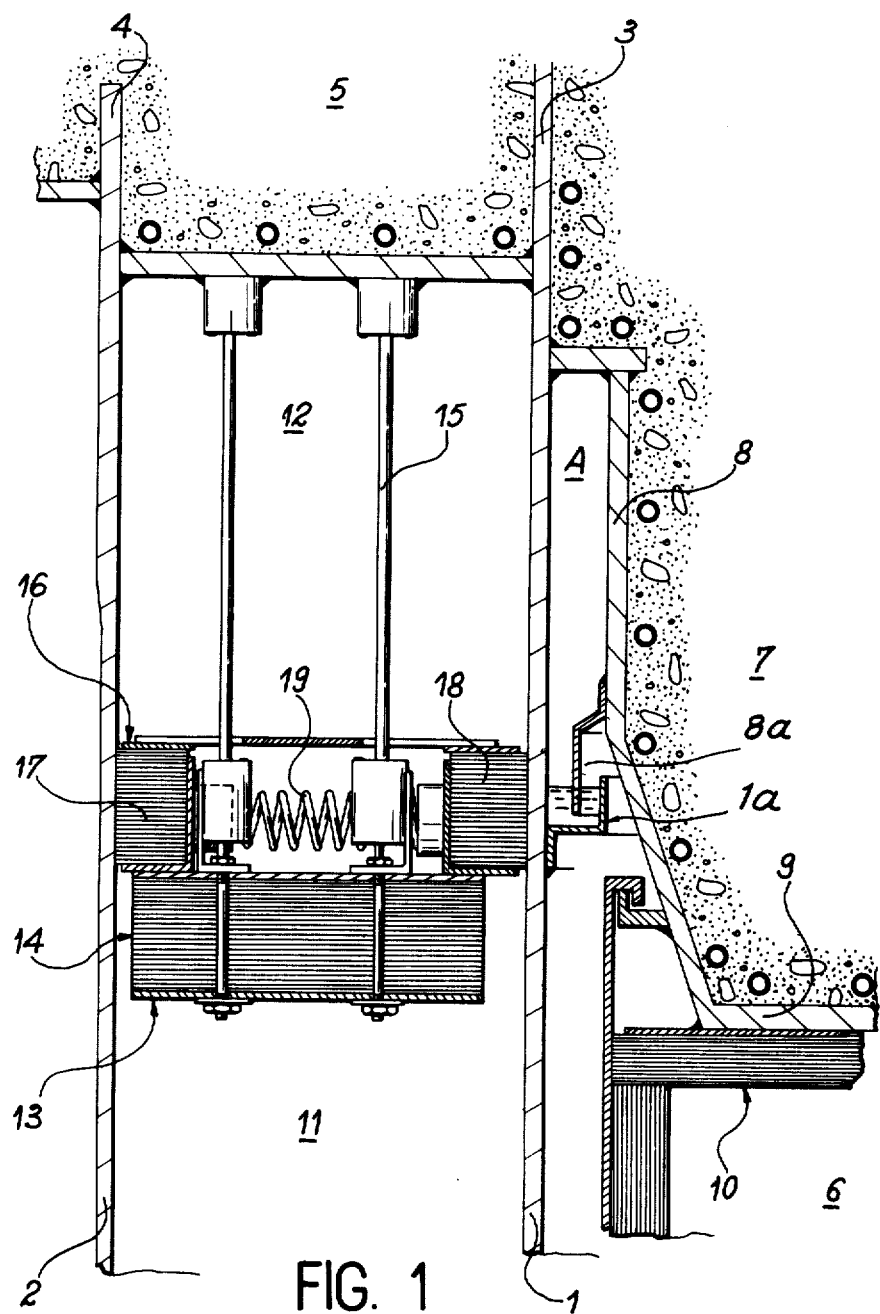
FIG. 1 is a diagrammatic view, partly in section, of the top parts of the main and safety vessels of a fast-neutron nuclear reactor, bounding an annular space provided with a heat-insulating system according to the invention.

In FIG. 1, references 1 and 2 denote the walls of the main and safety vessels of a fast-neutron nuclear reactor, the nature and a function of these vessels being conventional in the relevant art. The two vessels have a common vertical axis (not shown in the drawing) and their top ends 3, r respectively fit into a horizontal concrete closure slab 5 which surrounds the vessels and from which they are suspended, the slab being cooled by water ducts 5a embedded therein and adapted to maintain its temperature below approximately 60° C. The slab periphery rests on a bearing structure forming a protective enclosure for the reactor (not shown). The inner region 6 of the main vessel 1 contains the reactor core and a suitable volume of a cooling liquid metal. Above region 6, slab 5 has a central part 7 extending slightly inside the vessel and laterally bounded a collar 8, the bottom end of which is secured to a metal baseplate 9 under the slab. A heat-insulating structure 10, details of which are irrevelant to the invention, is secured to plate 9. Advantageously, collar 8 comprises an annular strip 8a, the bottom end of which is immersed in a cup 1a filled with the liquid metal which, if necessary, flows at a substantially constant temperature. The cup is secured to the wall of the main vessel towards the interior thereof. The assembly forms a liquid seal for insulating the space A between flap 3 and collar 8 from aerosols of the metal cooling the reactor core in region 6. Alternatively, space A can be occupied by annular heat-insulating elements having a suitable structure.

The two coaxial vessels 1, 2 together bound an annular space 11, normally filled with an inert gas, usually nitrogen, which is raised to a relatively high temperature during reactor operation owing to its contact with the outer surface of the main vessel 1, which contains sodium for cooling the core. According to the invention, a heat-insulating system 13 described hereinafter is provided for insulating the top part 12 of space 11, for example near the flaps 3, 4, and more particularly for protecting the place where the vessels fit into slab 5.

As shown in FIG. 1 and on a larger scale in FIG. 2, the device mainly comprises a bottom, substantially cylindrical ring 14 extending all around the annular space 11, ring 14 being secured under the slab by oscillating tie-rods 15, details of which will be given hereinafter. A top ring 16 formed of two annular segments 17, 18 rests on ring 14. The assembly seals region 12, completely insulating it from the rest of the annular space 11, for example because elements 17, 18 of the top ring are pressed against the facing surfaces of vessels 1, 2 by an assembly of springs 19 disposed radially between the elements.

The bottom ring 14 advantageously comprises a heat-insulating structure which may be similar to a structure designed for thermal protection of the slab base-plate in a fast-neutron nuclear reactor, as described and claimed in U.S. Pat. No. 3,945,165. In this case, the ring comprises a stack of metal sheets 20 forming successive superposed panels or pads separated from one another by thin plates 21, the panel assembly being subsequently secured between two thicker, parallel, horizontal end plates 22, 23 respectively and then clamped between the end plates by bolts 24, the ends of which are threaded so as to cooperate with nuts 25 and 26. The stack of sheets 20 is laterally bounded by angle members 27, 28 which fit together so as to bound a narrow space for suitably insulating the structure from the surrounding atmosphere, for example the inert gas in space 11. The plate 22 of ring 14 is secured by angle members 29 to hollow housings 30, equal in number to the tie-rods 15, to which the housings are directly connected. The top parts 31 of bolts 24 penetrate into the housings, to facilitate vertical adjustment of the bottom ring 14 relative to housings 30 and the bottom end of rods 15. When the adjustment has been made, the locking nuts 16 and angle members 29 are advantageously welded together to avoid any subsequent movement.

Housings 30 are closed at the top by a plate 32 which is secured by screws 33 and has a cup-shaped inner surface and a central aperture through which the bottom end of rods 15 extends. Each tie-rod, in the part which engages in the corresponding housing 30, comprises a ball-and-socket joint 34 screwed on to a threaded extension 35 secured to the end of a tube 36 forming the body of the tie-rod; the opposite end of the tube, near slab 5, is provided with a second threaded extension 37 likewise bearing a ball-and-socket joint 38 bearing against a plate 39 having a cup-shaped cross-section and closing a second housing 40 for securing rod 15. For this purpose, housing 40 is welded under a roof plate 41 bounding the top of the region 12 to be insulated. This tie-rod structure 15 is adapted to give the rods two degrees of liberty with respect to plate 41 under slab 5, so that the bottom ring 14 can perform relative oscillations, if required, when acted upon by the temperature variations between its two surfaces. Advantageously, joints 34, 38 and the cup-shaped plates 32, 39 against which they bear are surface-heated before assembly, e.g. by coating with "Stellite", to improve their coefficient of friction. Note that, in all cases, the joints and bearing plates can be dismantled, thus giving access to the bottom ring 14 for repairs or maintenance if required.

Figure 2:
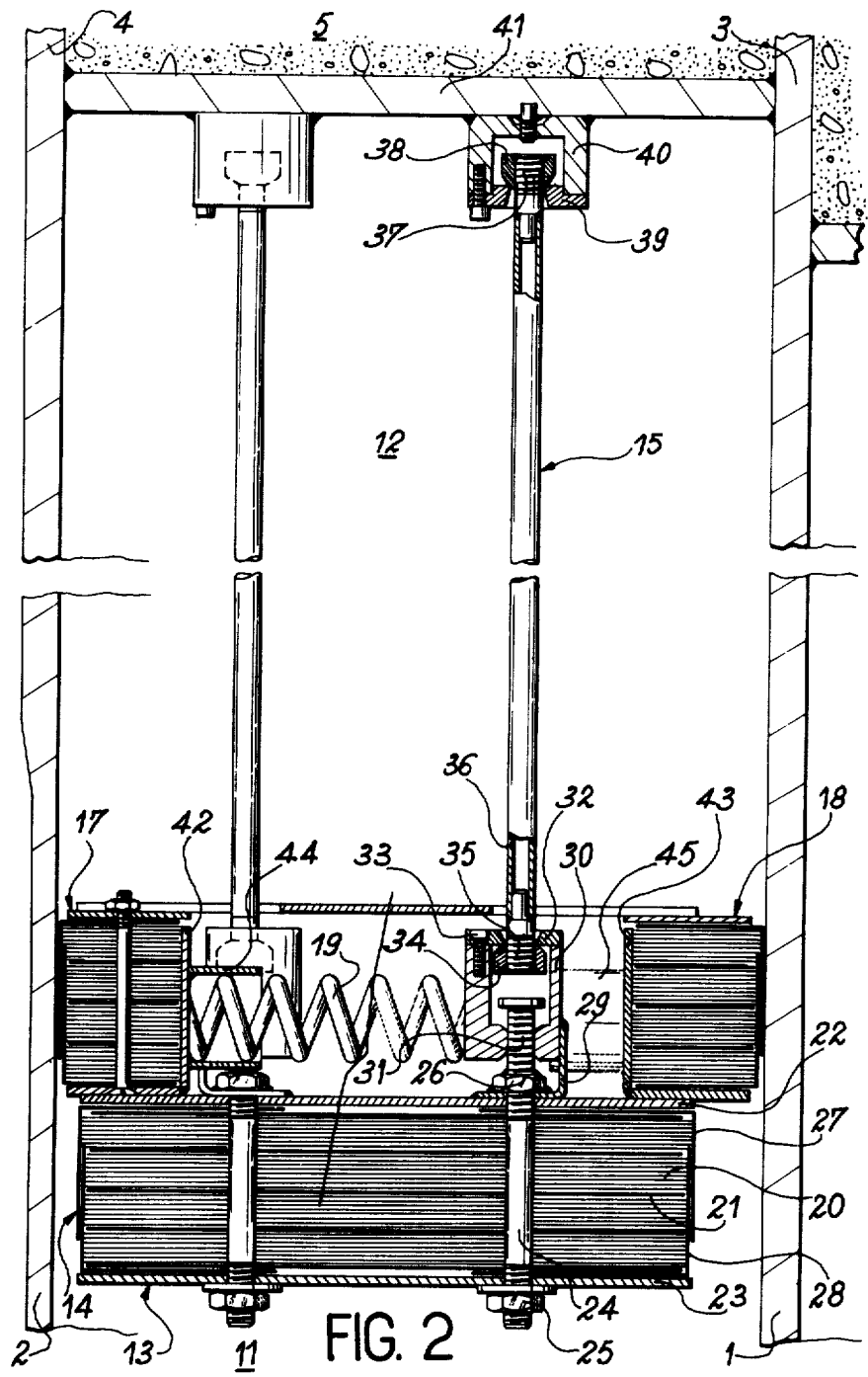
FIG. 2 is a larger-scale view of the system of FIG. 1.

FIG. 2 also illustrates the construction of elements 17, 18 forming the top ring 16. As FIG. 2 shows, elements 17, 18 are in the form of a heat-insulating structure similar to that provided for ring 14, and their facing surfaces are also flanked by bearing plates 42, 43 for the ends of the spacing springs 19. Advantageously, springs 19 are guided in open sleeves 44, 45 which are welded to plates 42, 43 so that the ends of the springs can fit into them.

Finally, FIG. 3 is a partly expanded view of an embodiment of the bottom ring 14 and each component of the top ring, e.g. segment 17. As the expanded view shows, each of the aforementioned components is advantageously made up of juxtaposed segments, i.e. 14a, 14b respectively in one case and 17a, 17b in the other, the segments having a herring-bone cross-section so that they can interlock and provide a continuous heat-insulating structure all round the annular space 11. FIG. 3 also shows that the roof plate 41, which bounds region 12 under slab 5, can be provided with orifices for ducts 46 giving access to region 12, for example for inserting measuring or test apparatus or for inspecting the surfaces of the two vessels.

The resulting heat-insulating system has the advantage of completely insulating the top portion of the annular space between the two vessels while allowing for differences in expansion, since the spacing springs permanently press the elements of the top ring against the walls of the vessels. The proposed structure is such that certain devices or components such as leak detectors or thermocouples can easily be mounted in this region. Finally, the successive segments forming the rings can easily be dismantled through apertures formed for this purpose on the slab.

I claim:

1. A heat-insulating device, for insulating the top part of the annular space separating the main vessel from the safety vessel of a fast-neutron nuclear reactor, the two vessels having a common vertical axis and being open at their top part and covered by a horizontal slab of concrete, in which the ends are suspended by the slab, the device comprising a cylindrical bottom heat-insulating ring mounted under the slab and adjacent the facing walls of the vessels to bound the regions to be insulated, the ring extending through the annular space in a horizontal plane and connected to the slab by tie-rods, and a top heat-insulating ring divided into two coaxial elements resting on the bottom ring and pressed and sealed against the walls of the two vessels respectively by an assembly of spacing springs disposed radially and bearing against the two elements.

2. A heat-insulating device according to claim 1, said tie-rods for the bottom ring comprising vertical suspending rods ending in ball-and-socket joints engaging in cup-shaped housings connected to the slab and to the bottom ring respectively.

3. A heat-insulating device according to claim 1, said bottom ring and the two components of the top ring comprising juxtaposed segments.

4. A heat-insulating device according to claim 3, said segments having an interlocking cross-section and fitting together in pairs around the ring periphery.

5. A heat-insulating device according to claim 1, said bottom ring including means for adjusting its vertical position with respect to the bottom cut-shaped housings of the tie-rods.

6. A heat-insulating device according to claim 1, said springs for spacing the elements of the top ring being guided at their ends bearing against said elements by open sleeves welded to the facing surfaces of the elements.

7. A heat-insulating device according to claim 1, said bottom ring and the elements of the top ring having a heat-insulated structure comprising superposing panels each further comprising a plurality of stacked metal sheets, the panels being separated by plates to form thick superposed pads held between end-plates and pressed between the plates by clamping bolts, the side edges of the rings being bound by interlocking angle members.

8. A heat-insulating device according to claim 1, the inner wall of the main vessel having at the level of the heat insulation a cup filled with liquid metal at a given constant temperature.

* * * * *